Jan. 6, 1942.   G. W. BLESSING   2,269,245
MOTOR
Filed Sept. 1, 1939

Inventor
Gregory W. Blessing
By
Attorney

Patented Jan. 6, 1942

2,269,245

UNITED STATES PATENT OFFICE 2,269,245

MOTOR

Gregory W. Blessing, Moorestown, N. J., assignor to Radio Corporation of America, a corporation of Delaware Application September 1, 1939, Serial No. 292,998

6 Claims. (Cl. 248—18)

This invention relates to electric motors of the synchronous type, and more particularly to a motor adapted for use especially in phonographic apparatus, the present invention being an improvement upon those disclosed in Patents Nos. 2,113,384 and 2,157,158.

In each of these patents, there is disclosed a synchronous motor having a rigid frame which supports the operating parts of the motor and which is secured to the motor board of the phonograph, usually by a plurality of screws and bolts. In order to prevent mechanical vibrations arising in the motor from reaching the motor board, so that the pickup mechanism also carried by the motor board will not be affected by such vibrations, it has been customary to interpose between the frame and the motor board coupling elements including rubber cushions and grommets, thereby necessitating also the use of spacers, washers, etc., for efficiently mounting the motor. This not only has the effect of considerably slowing up assembly during production, but also adds to the cost of assembly.

In another form of motor, such as that, for example, disclosed in the copending application of Emile C. Guedon, Serial No. 222,167, filed July 30, 1938, and assigned to the Radio Corporation of America, now Patent No. 2,207,251, the hub which supports the stator is provided with a rubber sleeve or bushing which is also intended to vibration-insulate the fixed parts of the motor from the motor board to prevent transmission of vibrations to the latter and through it to the pickup. Here, again, therefore, there is involved an expense and time necessary for proper assembly of the parts.

The primary object of my present invention is to provide an improved motor and mounting of the type under consideration which is of greatly simplified construction and which may be assembled with great speed and facility.

More particularly, it is an object of my present invention to provide an improved motor and mounting therefor which comprises a minimum number of parts and which can be readily assembled even by one who is unskilled in such practice.

It is also an object of my present invention to provide a motor and mounting therefor as aforesaid which is extremely inexpensive in cost, which is highly efficient in use, and which has a long life.

In accordance with my present invention, I provide a frame for the motor which comprises merely three radially extending arms or rods which are secured to the hub of the motor and which are received in resilient coupling members on the motor board, the resilient coupling members being made of rubber and constituting the sole connection between the frame and the motor board. These coupling members are received in radially extending slots of the motor board and are preferably T-shaped, having greater dimensions in a radial direction and in a direction normal to the plane of the motor board then in a transverse direction, or in a circumferential direction with respect to the motor axis. Thus, the coupling members are relatively rigid in the former two directions but relatively yieldable in the latter directions, so that the frame is capable of slight circumferential movement relative to the motor board but without transmitting any oscillations to the motor board and the parts carried thereby.

The novel features that I consider characteristic of my invention are set forth with particularity in the appended claims. The invention itself, however, both as to its organization and method of operation, together with additional objects and advantages thereof, will best be understood from the following description of one embodiment thereof, when read in connection with the accompanying drawing in which—

Figure 1:
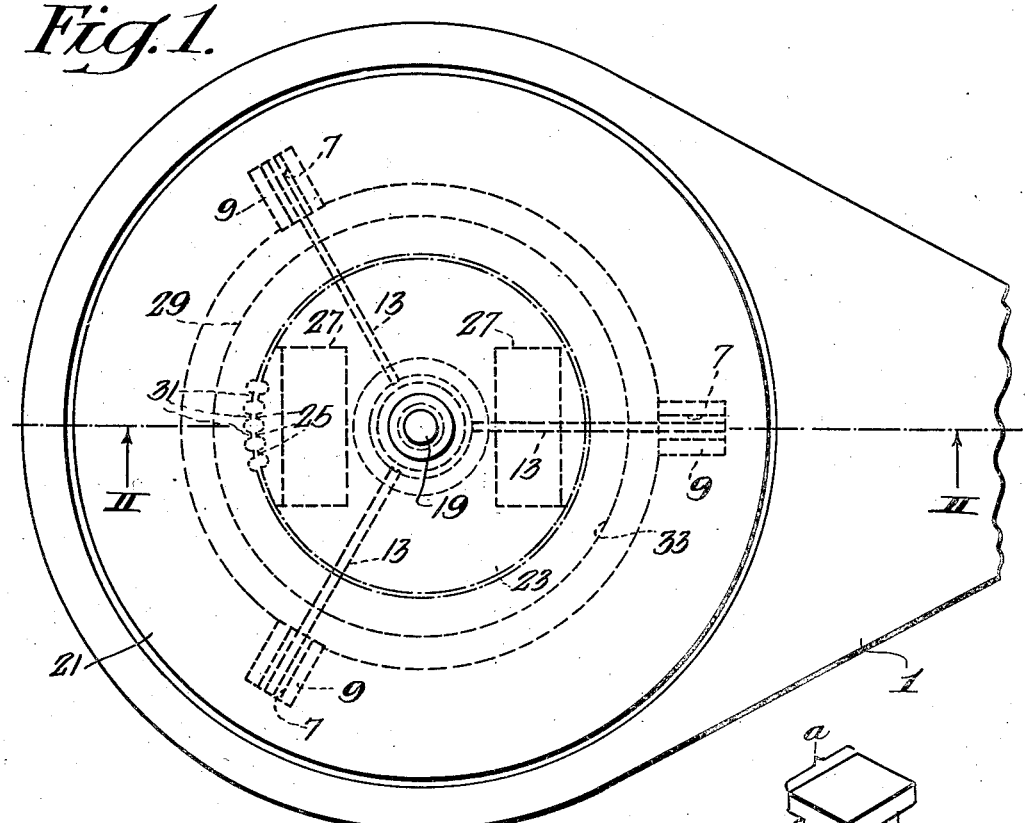
Figure 1 is a top plan view of a phonograph embodying one form of my invention.
Figure 3:
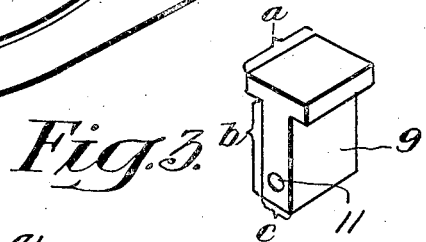
Figure 3 is a perspective view of one of the coupling members between the motor frame and the motor board.
Figure 2:
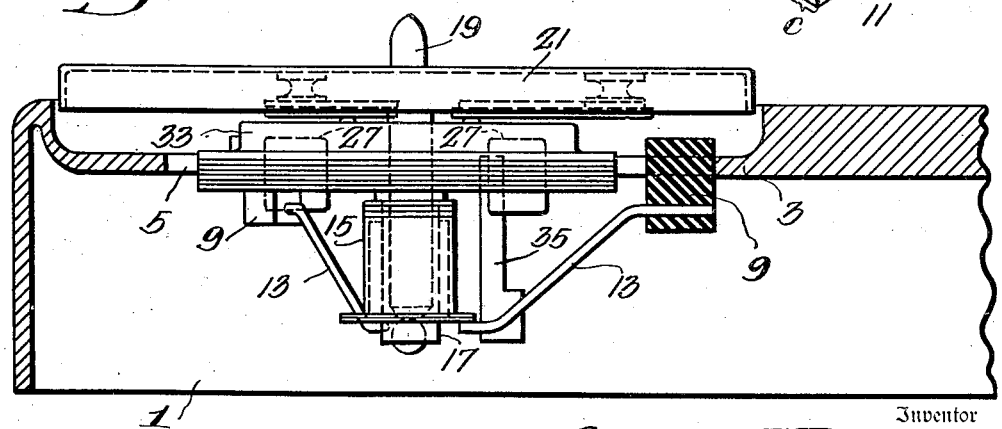
Figure 2 is a sectional view thereof taken along the line II—II of Figure 1.

Referring more particularly to the drawing, wherein similar reference characters designate corresponding parts throughout, I have shown a cabinet 1 having a recessed motor board 3 formed with a relatively large opening 5 and with a plurality of radially extending slots 7 communicating with the opening 5. In each of the slots 7, there is frictionally received a rubber coupling member 9 preferably of T-shape and preferably so formed that it has much greater dimensions along the lengths $a$ and $b$ than along its thickness $c$. Thus, the coupling members 9 are relatively flexible along the thickness $c$ but relatively inflexible along the lengths $a$ and $b$, and this is for a purpose presently to be set forth.

Frictionally received within openings 11 in the coupling members 9 are the ends of a plurality of arms 13 equally spaced about and extending radially from the hub 15 of a motor. The motor is preferably of the synchronous type disclosed in the above-noted patents and includes a bushing 17 within the hub 15 and in which is rotatably mounted a spirdle 19 carrying a record-supporting turntable 21. Fixed to the upper end of the bushing 17 is a stator 23 provided with a plurality of peripheral teeth 25 constituting pole faces and having a pair of energizing coils 27 mounted thereon. The motor also includes an annular rotor 29 surrounding the stator 23 and provided with a series of internal teeth 31 of substantially the same arcuate length as the teeth 25, the teeth 31 cooperating with the teeth 25 to constitute cooperating pole faces. The rotor 29 preferably has secured thereto a disc-like member 33 which may be connected to the turntable 21 in the manner disclosed and claimed in my copending application, Serial No. 292,997 filed September 1, 1939, now Patent No. 2,247,648. A spring 35 secured to one of the arms 13 and extending upwardly through the stator 23 serves to restrain the stator against oscillation.

In assembling the motor on the motor board, the rubber coupling members 9 are slipped onto the ends of the radial arms 13 constituting the frame of the motor, after which the assembly is mounted on the motor board 3 by simply pressing the legs of the members 9 downwardly through the slots 7 to suspend the motor from the motor board 3. By properly dimensioning the members 9 and the slots 7, it is obvious that the motor will become automatically centered in the opening 5 which receives the stator and rotor structure. The assembly is carried out quickly and with great facility, and, when once in place, will hold the motor firmly against movement in a radial direction as well as in a direction normal to the plane of the motor board 3. However, because of the relative flexibility of the downwardly extending legs of the coupling members 9 in a circumferential direction relative to the axis of the spindle 19 (that is, along the length c), it is obvious that any tendency for the motor frame to vibrate in such direction will have no effect upon the motor board, inasmuch as the vibrations or oscillations will be readily absorbed by the members 9.

Although I have shown and described but one embodiment of my invention, it will be obvious to those skilled in the art that many other modifications thereof and changes therein are possible. For example, the members 9 need not be T-shaped, but may be of any other desired formation, such as cylindrical, for example, and formed with an enlarged head corresponding to the cross heads of the members 9 to prevent them from slipping through the motor board. Also, the slots 7 need not be made to communicate with the opening 5, if this is not desired. Many other changes will be obvious to those skilled in the art. I desire, therefore, that my invention shall not be limited except insofar as is made necessary by the prior art and by the spirit of the appended claims.

I claim:

1. In combination, a motor board having a plurality of openings therein, a motor including a frame having a plurality of outwardly extending, circumferentially distributed arms, and rubber coupling means extending through each of said openings and supported by said motor board, the free ends of said arms being received in said coupling members, and said coupling members constituting the sole connection between said frame and said motor board.

2. The invention set forth in claim 1 characterized in that said coupling members are of greater dimension in a radial direction than in a circumferential direction relative to the axis of the motor whereby said coupling members will yield more readily in said circumferential direction in said radial direction.

3. The invention set forth in claim 1 characterized in that said coupling members are of greater dimension in a direction normal to the plane of said motor board than in a circumferential direction relative to the axis of the motor whereby said coupling members will yield more readily in said last-named direction than in said first-named direction.

4. In combination, a motor board having a plurality of openings therein, and a rubber member frictionally fitted in each of said openings for supporting a motor, said members each having a relatively greater height and depth than thickness and being so arranged on said motor board that the height thereof extends substantially parallel to the motor axis, the depth thereof extends substantially radially of the motor, and the thickness thereof extends substantially circumferentially of the motor.

5. The invention set forth in claim 4 characterized in that each of said rubber members has a head of greater dimension than the body thereof in a direction circumferentially of the motor, the engagement of said heads with said motor board preventing said members from slipping through said openings.

6. The invention set forth in claim 4 characterized in that each of said rubber members is of T-shaped cross section, and characterized further in that said members are so arranged with said openings that the heads of the T's engage said motor board to prevent said members from slipping through said openings.

GREGORY W. BLESSING.